Figure 2:
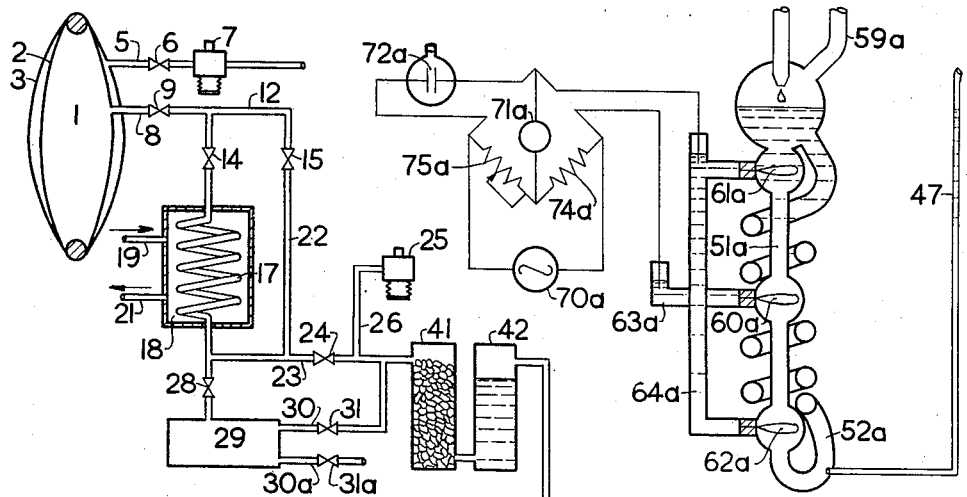

Feb. 4, 1941.    G. L. HASSLER    2,230,593
APPARATUS FOR ANALYZING GASEOUS MIXTURES
Filed Oct. 31, 1938

Inventor: Gerald L. Hassler
By his Attorney:

UNITED STATES PATENT OFFICE 2,230,593

APPARATUS FOR ANALYZING GASEOUS MIXTURES

Gerald L. Hassler, Berkeley, Calif., assignor to Shell Development Company, San Francisco, Calif., a corporation of Delaware Application October 31, 1938, Serial No. 237,914

1 Claim. (Cl. 23—254)

This invention pertains to a method and apparatus for analyzing a gaseous mixture for the presence therein of hydrocarbons, and finds a particularly useful application in methods of underground exploration, whereby indications of the presence of certain substances, such as oil, in or under certain formations are derived from the analysis of gases drifting by diffusion upwards to the surface of the ground. Recent investigations have shown that when samples of soil gases are collected from a plurality of stations gradually approaching an oil deposit from any direction on the surface of the ground, the amount of gaseous hydrocarbons, and the ratio of ethane and higher hydrocarbons to methane in said soil gases also gradually increases, owing to the fact that the higher hydrocarbons diffuse through the soil layers at a slower rate than methane. Since, however, the concentration of the hydrocarbons in the samples obtained is exceedingly small, amounting, for example, to about 3 to 300 parts per million, it is obvious that extremely accurate methods must be used in analyzing said soil gases to obtain data of any value from an exploration standpoint.

Briefly stated, the process of the present invention consists in exposing a gaseous mixture comprising hydrocarbons to a heated element in the presence of oxygen to convert said hydrocarbons to carbon dioxide, passing the combustion products through a weak solution of a hydroxide of a metal forming substantially insoluble carbonates, or carbonates having a very low solubility product, determining the concentration of carbon dioxide in said combustion products from the variations in the electric current passed between electrodes immersed in said solution, and calculating therefrom the concentration of hydrocarbons in the original gaseous mixture.

The same method may be used for the detection and measurement of sulfur or hydrogen sulfide, whose presence in soil gases is sometimes indicative of the nearness of petroleum deposits.

Although methods of measuring small concentrations of a material, such as carbon dioxide, by measuring the changes in the conductivity of an electrolytic solution produced by a chemical reaction with said material are well known to the art, their application has been heretofore limited to batch processes because of the physical or mechanical disturbances or variations in electrical conductivity incidental to the continuing chemical reaction. Thus, in the measurement of carbon dioxide, the conductivity of the conventional electrolytic analysis cell is so disturbed by the presence near the electrodes of gas bubbles rising through the solution that it is impossible, by methods previously used, to follow continuously the changes in the specific conductivity of the solution. It has, therefore, been until now considered necessary to perform the analysis in several distinct operations: first, measuring the conductivity of the solution; second, passing a fixed quantity of gas through the solution; and, third, measuring the changed conductivity after discontinuing the passage of gas. These separate operations require the use of batch methods, and are, therefore, subject to all the disadvantages inherent to batch processes.

In the determination of minute concentrations of hydrocarbons (or any other substances) dissolved or suspended in a gas, the biggest difficulty has to do with the adsorption of the gases on the walls of the containing vessels. For example, if a sample of gas, containing ten parts per million of ethane, be passed into a vessel which is perfectly clean and held there for a few minutes, it may have only five parts per million when discharged. This effect is a surface effect, and as such is an extremely variable thing. While it may be possible to correct for adsorption effects after long experience with a particular set of vessels, it may be noted that a surface will come to equilibrium with the gas contained in it, after repeated fillings, so that after a number of fillings the discharged gas will have the same concentration as the entering gas, provided, of course, that the vessel is not disturbed by temperature or other changes. Surface effects may be further reduced by the use of large vessels, so that the ratio of containing surface to contained volume may be reduced. But the use of large vessels, with repeated fillings to attain equilibrium, necessarily demands the use of a very large volume of sample. It is clear, then, that since the volume necessary to attain adsorption equilibrium increases with decreasing concentration of the sample, this process becomes unwieldy when the concentration of the constituent which is to be measured becomes low, and it follows that batch methods of analysis are not suitable for very low concentrations.

On the other hand, an analysis method which provides for a continuous passage of the gas through tubes of restricted surface area can be used to avoid this difficulty, because the exposed surface will quickly reach an adsorption equilibrium with the passing gas, and after a short period the gas discharged from any section of the flow system will be identical with gas which enters that section. This is true even if the nature of the surface of the passages is not carefully controlled. Hence, a certain amount of freedom in choice of materials and state of cleanliness of the analysis system is permissible if a continuous flow analysis system can be devised.

It is, therefore, the object of this invention to provide for an accurate determination of exceedingly small amounts of hydrocarbons or other gases in gaseous mixtures by means of a continuous process which avoids the disadvantages of the batch process recited above.

It is another object of this invention to provide for this purpose an analysis chamber wherein the desired chemical reaction can be carried simultaneously with the desired electrical conductivity measurements without disturbing the accuracy of the latter.

It is another object of this invention to provide a simple and portable apparatus whereby gas analysis may be quickly and accurately carried out at any station in the field where samples of soil gases are being collected for exploration purposes.

It is another object of this invention to provide a method whereby the ratio of the concentration of methane to that of ethane and heavier hydrocarbons in a gaseous mixture can be readily determined.

Figure 1:
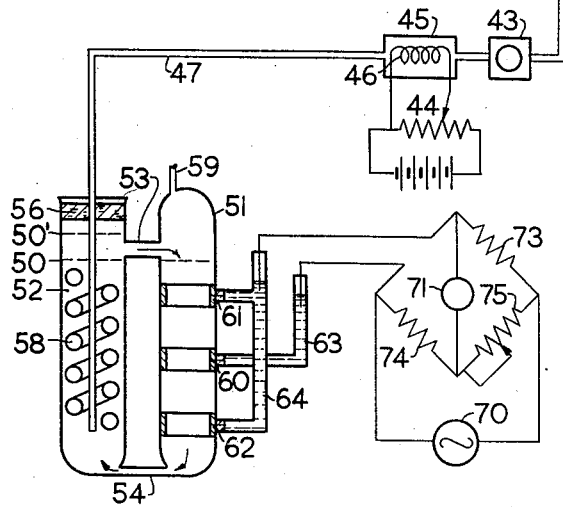
Figure 3:
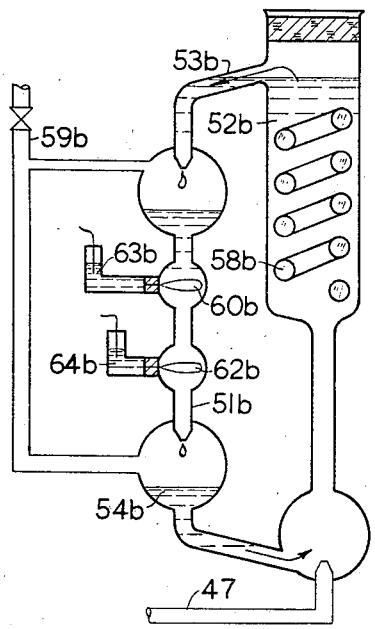

These and other objects of this invention will be understood from the following description taken with reference to the attached drawings, wherein:

Fig. 1 diagrammatically shows the arrangement of apparatus used in practicing the process of this invention;

Figs. 2 and 3 show different preferred embodiments of the reaction chamber used for said process.

Referring to Fig. 1, the present apparatus comprises a gas sample supply, such, for example, as a Cellophane or sausage bag 1, although any other suitable flexible or rigid gas container may equally well be used. The bag 1 consists of two concentric gas-tight bags 2 and 3, the inner bag 2 being held within the outer bag 3 to prevent contamination of the gas sample by diffusion through the Cellophane walls. Both bags 2 and 3 are filled with the gas sample, but only the sample held within the inner bag 2 is analyzed for its hydrocarbon content. The desired sample of soil gas held in bag 1 may be obtained by any desired method, such, for example, as described in my co-pending application Serial No. 190,473, filed February 14, 1938.

The space within the outer bag 3 is connected to the atmosphere through a pipe 5 provided with a check-valve 6 and a pump 7, which may preferably be of the so-called electric metal-bellows type. This pump requires no lubrication of the moving parts, whereby any contamination of the sample by hydrocarbon lubricants is prevented.

The space within the inner bag 2 is connected to the towers 41 and 42 through pipes 8, 12, 22 and 23, provided with valves 9, 15 and 24. The gas sample from bag 2 may alternatively be passed through a coil 17, immersed in a liquid-air chamber 18, wherein all hydrocarbons heavier than methane are condensed and removed to a container 29, while the non-condensible gas mixture comprising methane is passed to towers 41 and 42 through a pipe 23. The condensed hydrocarbons in container 29 may be subsequently vaporized by warming and passed to towers 41 and 42 through a pipe 30, provided with a valve 31, while their return to coil 17 is prevented by valve 28.

A pump 25, of the same type as pump 7, may be used to circulate air through the system by means of pipe 26, as will be described below.

The towers 41 and 42 are filled with substances capable of removing from the gas passing therethrough any carbon dioxide which may be naturally present therein, such, for example, as ascarite or a caustic alkali.

The gas flowing through towers 41 and 42 is passed further through a flow meter 43, whereby its amount is accurately ascertained, and enters a combustion chamber 45, comprising a spiral platinum wire 46, or any other suitable combustion element, which is electrically heated to a desired temperature such as bright red. By adjusting this temperature by means of the rheostat 44, and by regulating the rate of flow of the gas through the chamber 45, either a complete, or an incomplete combustion and conversion of hydrocarbons to carbon dioxide may be effected in chamber 45, as will be explained below.

The gaseous combustion products are passed through a pipe 47 to the reaction chamber, which may consist of a single chamber, of a chamber divided by a perforated partition, or, as shown in Fig. 1, of two cylindrical chambers 51 and 52, connected by conduits 53 and 54 between their upper and their lower portions, respectively. Chambers 51 and 52 are filled, as will be described later, with the desired solution, chamber 52 being the absorption chamber, and chamber 51 the electrode chamber. The orifice of pipe 47 is placed within the lower portion of chamber 52, entering said chamber, for example, through its open head, provided with a plug 56 made of cork, cotton or other porous or gas permeable material. A solid glass coil 58 may surround the pipe 47 within chamber 52, serving to guide along a spiral path the gas bubbles passed through the liquid in said chamber by means of pipe 49.

The chamber 51 is provided with a gas vent 59, and contains an inner electrode 60 and two outer electrodes 61 and 62. The electrodes 60, 61 and 62 may be made of platinum, platinum wire, platinized glass, platinized platinum, platinum black, etc., and may be of annular shape, as shown in the drawing, or of any other desired shape.

The outer electrodes 61 and 62 are connected in parallel, for example, by means of the mercury-filled tube 64 attached to the chamber 51 to one of the terminals of a measuring electrical circuit, while the inner electrode 60 is connected, through a similar tube 63, to the other terminal of said circuit.

The measuring electrical circuit may comprise a battery, a generator, or any other suitable source of E. M. F., the use of an alternator such as shown at 70 being preferable to avoid the polarization of the electrodes. The alternator 70 is connected to a Wheatstone bridge arrangement comprising an A. C. or D. C. galvanometer 71, fixed resistances 73 and 74, and a variable resistance 75, the electrolytic resistance between electrode 60 and electrodes 61 and 62 forming the unknown resistance of the Wheatstone bridge.

Another preferred embodiment of the analytical cell 51—52, which is especially advantageous because it permits the use of very small quantities of the liquid solution is shown in Fig. 2. In this embodiment, the electrode chamber 51 has the same elongated or cylindrical shape as in Fig. 1, its diameter being slightly enlarged at the places where the electrodes, shown in the form of platinum black loops 60a, 61a and 62a, are affixed. The absorption chamber is constructed in the form of a spiral coil 52a, which may be wound, if desired, around the chamber 51, the two chambers being in communication at their respective upper and lower portions.

The analytical cell shown in Fig. 1 or in Fig. 2 may be a chamber 72a, containing a platinized electrolytic resistance thermometer filled with a liquid having the same chemical composition as cell 51—52 and electrically connected to one of the Wheatstone bridge arms, whereby variations in the electrolytic resistivity between electrodes 60 and 61—62 due to variations of temperature occurring during the measurements are automatically balanced out.

The whole system, and especially the analytical cell and the resistance thermometer, are furthermore kept at a constant temperature, for example, by immersion in a melting ice liquid, or by any other suitable thermostatic means.

The three electrode system described above is advantageous since the electrolytic resistance measured thereby depends only on the properties of the solution in chamber 51 between the outer electrodes, and is independent of the properties of the solution in chamber 52, there being no potential difference between the outer electrodes. To illustrate, if only two electrodes, for example, referring to Fig. 1, 60 and 62, are used, there is a direct path for the current from electrode 60 to electrode 62 within chamber 51, and a parallel path from electrode 60 to electrode 62 through chamber 52, wherein a chemical reaction is in progress. Moreover, the present arrangement prevents the flow of the liquid past the electrodes from inducing any electrosmotic potentials, the latter being balanced out between the two electrode pairs (60 and 61, and 60 and 62).

Any other manner of mounting electrodes within chamber 51 may, however, be used, provided it does not depart from the principle of this invention, which consists in electrically isolating, that is, shielding or insulating that portion of the electrolytic liquid in which the electrodes are immersed from that portion in which the chemical reaction or the bubbling of the gas takes place, so that conductivity measurements may be carried out continuously and free from the effect of the conductivity variations or disturbances occurring in the reaction zone.

The method of electrical shielding, involving the use of three electrodes, has been illustrated in Figs. 1 and 2, while Fig. 3 illustrates a type of reaction cell wherein the electrode chamber is electrically insulated from the absorption chamber.

Referring to Fig. 3, the electrode chamber 51b is similar to that of Fig. 2, but has its lower end formed in the shape of a dropper projecting into a chamber 54b, while the conduit 53b connecting chambers 52b and 51b is also made in the form of a dropper projecting into the upper enlarged portion 53c of the electrode chamber. The absorption chamber 52b is filled with the electrolytic liquid to such a level that when gases from the combustion chamber 45 are injected thereinto, said liquid overflows through conduit 53b, and falls into the electrode chamber in the form of discrete drops, and, after passing through the electrode chamber, falls again in the form of discrete drops into chamber 54b, and is thence recirculated through the system. The gaseous space in chambers 53c and 54b is maintained by applying a suitable gaseous pressure through tube 59b.

It will be seen that by means of this arrangement, the electrode and the absorption chambers, although in liquid communication, are electrically insulated from each other, whereby the use of only two electrodes is made possible.

Chambers 51 and 52 are filled with an aqueous solution capable of reacting with carbon dioxide to form an insoluble precipitate or a non-ionized reaction product, in such a manner as to give a maximum proportional change in the conductivity of the solution per unit volume of carbon dioxide passed through said solution. The oxides or hydroxides of the alkaline earth metals, barium, calcium and strontium, are very suitable for the purposes of this invention, because of the high solubility of their oxides and of the very low solubility product of their carbonate. Likewise, aqueous solutions of silver and lead oxides may be advantageously used, since silver oxide has a water solubility of 0.00215 gr. and lead oxide of 0.0017 gr. per 100 cc. of water at 20° C., while their carbonate solubility products are $6.15 \times 10^{-12}$ at 25° C., and $3.3 \times 10^{-14}$ at 18° C., respectively. These bases are minutely soluble in water, but their solubilities are sufficiently greater than the carbonate solubility to permit measurements of low hydrocarbon concentrations generally not exceeding $8 \times 10^{-5}$.

The use of hydroxides of metals whose bases have exceedingly low solubility products makes it possible to carry out the present process of analysis under conditions of extremely low conductivity of the solution, so that as stated above, a given volume of carbon dioxide passed through said solution will give a large proportional change in its electrical conductivity.

The amount of the solution held in chambers 51 and 52 should therefore obviously be as small as possible, preferably between 15 and 30 cc. and the concentration of said solution be kept at a very low value.

It is also possible to use hydroxides, such as sodium hydroxide, which will react with carbon dioxide gas with a consequent change in conductivity of the solution. Because the conductivity of the carbonate ion is considerably less than the hydroxyl ion in the reaction mentioned, there is a decrease in solution conductivity which can be effectively measured. This method may better be used in those cases where great sensitivity is not necessary, or may be attained by refined electrical measurement, as the reaction proceeds more smoothly in the absence of an insoluble reaction product.

In practicing the present invention, the following procedure may be followed:

The chambers 51 and 52 are filled to a level 50, just below the conduit 53 between said chambers with distilled water, to which a small quantity, such as one drop, of one of the hydroxides recited above is added, bringing the concentration of said hydroxide in the liquid filling chambers 51 and 52 to a desired very small concentration.

With the filament 46 heated to a desired degree, and with the valves 24 and 31 from the gas reservoir 1 closed, air is passed through the system by means of pump 25 at a rate measured by the flow meter 43. This air enters chamber 52 from the tip of tube 47, and bubbles upwards therethrough between the coils of the spiral tube 58 (or through the coiled chamber 52a of Fig. 2). The bubbling effect of the gas raises the solution in chamber 52 to a level 50', and causes a pumping action whereby the solution filling chambers 51 and 52 is made to circulate in a direction shown by arrows in the drawing, while the excess gas escapes through the porous plug 56 and vent 59. A desired direct, commutated or, preferably, alternating potential is applied to the electrodes 60, 61 and 62 by means of the electrical circuit shown, and a current of very low intensity flows between these electrodes, due to the weak concentration of the solution in which said electrodes are immersed. The resistance of the solution to the current flow is measured by means of the galvanometer 71. This procedure is continued until the whole system comes to equilibrium, and the rate of change of conductivity with volume of gas passed as indicated by galvanometer 71 assumes a steady value. The pump 25 is then stopped, the valve 14 closed, and valves 15 and 24 are opened. The pump 7 is then started, forcing air into the outer bag 3, whereby the gas sample is forced from bag 2 and passes through towers 41 and 42, where the natural carbon dioxide is removed therefrom, through flow meter 43, through the combustion chamber 45, wherein the hydrocarbons present in the gas are converted to carbon dioxide, and through the absorption chamber 52, wherein the carbon dioxide combines with the hydroxide solution to form a carbonate, the liquid solution being circulated in chambers 51 and 52 as before. As the highly dissociated or ionized hydroxide solution is gradually converted to a weakly ionized solution of a carbonate having a very low solubility product, the intensity of the current passing between electrodes 60, 61 and 62 is gradually decreased, and the readings taken at desired intervals of time by means of the galvanometer 71 show increasing values of resistance within the electrode cell 51.

Knowing the quantity and the equivalent conductivity of the original hydroxide solution, the quantity of gas passed through said solution in a given time, the resistance of the electrode cell, and the potentiometer readings, it becomes possible to calculate the concentration of the carbon dioxide present in the gas after combustion, and therefore the concentration of the hydrocarbons in the original gas sample.

When it is desired to determine not only said concentration, but also the ratio of methane to ethane and heavier hydrocarbons in soil gases, the following procedure may be followed:

The valve 15 is closed, the valve 14 is opened and the gas sample is passed through coil 17, immersed in the liquid air within the container 18. Ethane and all heavier hydrocarbons are thereby condensed, while methane and the rest of the incondensible gases of the sample pass through the combustion chamber 45 and the reaction chambers 51 and 52, the same procedure being followed as before. The ratio of the methane concentration, as determined in this manner to the total hydrocarbon concentration in the sample, as determined during the previous operation, may thus be easily determined.

If desired, the heavy hydrocarbons condensed in coil 17 and withdrawn to chamber 29 may be vaporized by warming to normal temperatures and then passed, by means of a pipe 30 through the combustion and the absorption chambers as before, whereby a check on the accuracy of the calculated methane-ethane concentration ratio may be obtained, or said ratio independently calculated.

It is also possible to determine the ratio of methane to heavier hydrocarbons by adjusting the combustion element 46 to such degree of heat that only a partial combustion of hydrocarbons, for example, only the combustion of methane, will occur in the combustion chamber 45, which may be achieved by suitably adjusting and calibrating the apparatus. By repeating the run with the filament 46 heated so as to give a complete combustion of all hydrocarbons, the desired ratio of methane to heavier hydrocarbons may be determined in the same manner as outlined above.

I claim as my invention:

In an apparatus for analyzing a gas mixture, a cell comprising a reaction chamber and an electrode chamber adapted to be filled with an electrolytic liquid capable of reacting with said gas mixture, liquid conduits between said two chambers forming in combination therewith a hydraulic circuit, means to maintain a liquid circulation through said circuit, flow-restricting means adapted to maintain an air gap within said hydraulic circuit at either side of the electrode chamber, thereby electrically insulating said chamber, means to pass the gas mixture through the liquid within the reaction chamber, at least two electrodes within the electrode chamber, means to pass an electrolytic current between said electrodes within the electrode chamber, and means for observing changes in the specific conductivity of the liquid due to its reaction with the gas mixture.

GERALD L. HASSLER.